(12) United States Patent
Shanbhag et al.

(10) Patent No.: US 7,561,617 B1
(45) Date of Patent: Jul. 14, 2009

(54) CHANNEL MONITORING AND IDENTIFICATION AND PERFORMANCE MONITORING IN A FLEXIBLE HIGH SPEED SIGNAL PROCESSOR ENGINE

(75) Inventors: Abhijit G. Shanbhag, San Jose, CA (US); Abhijit Phanse, Sunnyvale, CA (US); Jishnu Bhattacharjee, San Jose, CA (US); Debanjan Mukherjee, San Jose, CA (US); Prashant Choudhary, San Jose, CA (US); Edem Ibragimov, San Jose, CA (US); Venugopal Balasubramonian, San Jose, CA (US); Qian Yu, Cupertino, CA (US); Madabusi Govindarajan, Sunnyvale, CA (US)

(73) Assignee: INPHI Corporation, Westlake Village, CA (US)

( * ) Notice: Subject to any disclaimer, the term of this patent is extended or adjusted under 35 U.S.C. 154(b) by 0 days.

(21) Appl. No.: 11/859,649

(22) Filed: Sep. 21, 2007

Related U.S. Application Data

(62) Division of application No. 10/614,587, filed on Jul. 3, 2003, now Pat. No. 7,339,988.

(51) Int. Cl.
*H03H 7/30* (2006.01)

(52) U.S. Cl. .................. 375/229; 375/232; 375/233
(58) Field of Classification Search ......... 375/229–234, 375/243; 708/300–323; 331/18, 28 R
See application file for complete search history.

(56) References Cited

U.S. PATENT DOCUMENTS

| 5,347,541 | A | * | 9/1994 | Iltis et al. ..................... 375/230 |
| 5,568,411 | A | * | 10/1996 | Batruni ....................... 708/322 |
| 6,829,293 | B2 | * | 12/2004 | Jones et al. .................. 375/222 |
| 6,836,739 | B2 | * | 12/2004 | Sato ............................ 702/76 |
| 6,904,110 | B2 | * | 6/2005 | Trans et al. .................. 375/350 |
| 7,120,123 | B1 | * | 10/2006 | Quigley et al. .............. 370/252 |
| 2002/0041565 | A1 | * | 4/2002 | Valenti et al. ............... 370/201 |

* cited by examiner

*Primary Examiner*—Tesfaldet Bocure
*Assistant Examiner*—Lawrence B Williams
(74) *Attorney, Agent, or Firm*—Haynes and Boone, LLP.

(57) ABSTRACT

Systems and methods are disclosed to provide channel monitoring and/or performance monitoring for a communication channel. For example, in accordance with an embodiment of the present invention, an equalizer is disclosed that equalizes for channel distortions and also provides channel and performance monitoring information, such as for example bandwidth estimation, channel identification, signal-to-noise ratio, chromatic dispersion, and/or polarization-mode dispersion.

7 Claims, 8 Drawing Sheets

CHANNEL MONITORING AND IDENTIFICATION AND PERFORMANCE MONITORING IN A FLEXIBLE HIGH SPEED SIGNAL PROCESSOR ENGINE

BACKGROUND

This application is a divisional of U.S. patent application Ser. No. 10/614,587, filed Jul. 3, 2003, which is now U.S. Pat. No. 7,339,988 B1 which is herein incorporated by references for all purposes.

TECHNICAL FIELD

This invention relates generally to communication systems and, more particularly, to monitoring of a communication channel and its performance, such as for example, for dispersion compensation.

BACKGROUND

Communications systems often employ adaptive equalization to compensate for the distortion effects of changing channel conditions and disturbances on the signal transmission channel. The equalization process, for example, may estimate the transfer function of the transmission channel and apply the inverse of the transfer function to the received signal so as to reduce or eliminate distortion effects.

Channel equalization typically employs filters that remove amplitude and phase distortions resulting from a frequency dependent time variant response of the transmission channel, for example, to thereby provide improved symbol detection capability. The channel equalization may remove baseband intersymbol interference (ISI) caused by transmission channel disturbances, including the low pass filtering effect of the transmission channel. ISI may cause the value of a given symbol to be distorted by the values of preceding and following symbols, and essentially represents symbol "ghosts" because ISI may include advanced and delayed symbols with respect to a reference symbol location in a given decision region.

An adaptive equalizer may be viewed as a digital filter with an adaptive response to compensate for channel distortions. Several well-known algorithms are available for adapting the filter coefficients and thereby the filter response to converge the equalizer.

Significant effort has been spent enhancing adaptation algorithms for use in data transmission, whether over communication systems or from storage mediums. Such adaptation algorithms typically are employed to compensate for distortions introduced into the signals by the transmission medium through which the signals have traveled. Such transmission mediums might comprise, for example, optical networks, wireless networks, standard public switch telephone networks, or even storage media where the signals have been stored and transmitted through interfaces to a user.

In all of these situations, the media through which the signal is transmitted or in which the media is stored may, in fact, affect the contents of the signal. Accordingly, equalization systems are generally employed to place the signal as nearly as possible in its original form. However, because the exact nature of this distortion as to which the signal is subjected to may not be known at the receiving end, the structure and methods employed to equalize the received signals necessarily involve certain assumptions.

Typically, the techniques for enhancing the adaptation algorithms focus on the value of the signal at the time the signal is sampled (known as the convergence time). Very limited effort has been spent with respect to continuous time adaptation for continuous time delay line equalizers.

One technique which has been used to adapt the feedforward equalizer to compensate for signal distortion due to the transmission or storage media is known as discrete time least mean square based adaptation. Typically, the discrete time least mean square ("LMS") based adaptation is applied to the feedforward equalizer followed by decision feedback. This technique, which has been widely explored as a starting point for various enhancements for discrete time adaptation can be expressed as:

$$c_i[k+1] = c_i[k] + \mu * s_i[k] * e[k]$$

where:
- k=denotes discrete time points;
- u=is an adaptation parameter;
- $c_i$=denotes the $i^{th}$ tap either feed forward or feedback;
- $s_i[.]$=denotes the sampled input signal appropriately time aligned as applied to the $i^{th}$ tap; and
- $e[.]$=denotes the sampled slicer error signal, computed as the difference between the slicer input and slicer output signal appropriately time aligned.

The continuous-time analog of the above adaptation may be expressed as:

$$c_i(t) = \int_0^t \mu \cdot e(\tau) \cdot s_i(\tau) \cdot d\tau$$

One problem with this form of the adaptation is "coefficient drift" associated with fractionally spaced equalizers.

In general, a significant challenge within a communication system (e.g., a telecommunication network or a data retrieval system) has been the application of channel parameter measurement and performance monitoring techniques. These techniques are desired to assist with maintenance of the communication system and/or quality of service and possibly provide fault detection and isolation.

For example, the techniques may be utilized to provide relevant information or take remedial action during set-up or provide system optimization to enhance throughput, reliability, and/or monitor the health within the communication system on a real-time basis. It may also be important to have a measure of the quality of the signal to prevent any degradation in the quality of service through any path of the communication system. As a result, it would be desirable to have systems and methods for providing channel and performance monitoring.

SUMMARY

Systems and methods are disclosed herein to provide channel monitoring and/or performance monitoring for a communication system. For example, in accordance with an embodiment of the present invention, a flexible and adaptive equalization structure is provided. The equalization structure may provide equalization for channel distortions and may also provide key channel and performance monitoring information. Furthermore, one or more equalization techniques may be employed to determine various parameters, such as for example bandwidth estimation, channel identification, signal-to-noise ratio, chromatic dispersion, and/or polarization-mode dispersion.

As another example and in accordance with an embodiment of the present invention, a system and a method is provided for channel and performance monitoring for a high-speed link within an adaptive, flexible, continuous-time signal processing framework, such as within a fractionally-spaced transversal filter followed by a decision-feedback equalizer and which employs least mean square (LMS)-based adaptation. The techniques illustrated for the system and/or method may be also applied or extended to discrete-time signal processing architectures as well.

As another example and in accordance with an embodiment of the present invention, an equalizer is provided with feedforward equalization and decision feedback. One or more paths or elements of the equalizer may be powered down to provide communication channel and performance monitoring. For example, a slicer of the equalizer may be powered down, along with tap coefficient paths between an adaptive coefficient generator and a feedforward filter, to provide a bandwidth estimate for the communication channel. As another example, the slicer may be powered down and an additional input signal to the equalizer may be provided to allow for a channel identification estimation. Such a structure allows adaptive equalization, while also providing the ability and flexibility for channel monitoring and identification by selectively disabling signal paths. Values thus obtained may be used to estimate correlation values, e.g., for dispersion compensation.

More specifically, in accordance with one embodiment of the present invention, an equalizer includes a feedforward filter adapted to receive a first input signal and provide a first output signal; an adaptive coefficient generator adapted to receive the first input signal and a second signal and provide tap coefficients to the feedforward filter; a slicer adapted to receive a slicer input signal and provide a slicer output signal; a slicer timing alignment block adapted to receive the slicer input signal and provide a second output signal, wherein the slicer output signal is subtracted from the second output signal to generate an error signal; a tap timing alignment block adapted to receive the slicer output signal and provide a third output signal; a first low pass filter adapted to receive the third output signal and the error signal and provide a fourth output signal, wherein the fourth output signal is multiplied with the third output signal to provide a feedback signal which is added to the first output signal to generate the slicer input signal; and a second low pass filter adapted to receive the error signal and provide a mean square error signal.

In accordance with another embodiment of the present invention, a method for providing a bandwidth estimate for a communication channel using an equalizer, includes switching off a slicer of the equalizer; setting tap coefficients of a feedforward filter of the equalizer to fixed values; and calculating correlation coefficient values.

In accordance with another embodiment of the present invention, a method for providing a channel identification estimate for a communication channel using an equalizer, includes receiving a first input signal by a feedforward filter of the equalizer, wherein the feedforward filter provides a first output signal; receiving a second input signal denoted as r(t)*h(t), where h(t) represents an unknown channel impulse response for the communication channel and r(t) represents a random signal; subtracting the second input signal from the first output signal to provide a difference signal; and determining a set of tap coefficients for the equalizer that minimizes the difference signal.

In accordance with another embodiment of the present invention, a method for providing an optical signal-to-noise ratio estimate for a communication channel using an equalizer, includes calculating an unbiased electrical signal-to-noise ratio based on an input signal to a slicer of the equalizer and a mean square error signal generated by the equalizer; calculating an electrical signal-to-noise ratio based on the unbiased electrical signal-to-noise ratio and tap coefficients of a feedforward filter of the equalizer; and calculating the optical signal-to-noise ratio based on the electrical signal-to-noise ratio.

In accordance with another embodiment of the present invention, a method for providing a bit error rate estimate for a communication channel using an equalizer, includes calculating an unbiased electrical signal-to-noise ratio based on an input signal to a slicer of the equalizer and a mean square error signal generated by the equalizer; and calculating the bit error rate based on the unbiased electrical signal-to-noise ratio.

In accordance with another embodiment of the present invention, a method for providing an optical signal-to-noise ratio estimate for a communication channel using an equalizer, includes calculating an electrical signal-to-noise ratio based on tap coefficients of the equalizer; and calculating the optical signal-to-noise ratio based on the electrical signal-to-noise ratio.

In accordance with another embodiment of the present invention, a method for providing a chromatic dispersion estimate for a communication channel using an equalizer, includes determining a bandwidth roll-off within the communication channel; and estimating the chromatic dispersion by utilizing a look-up table and the results of the bandwidth roll-off determination.

In accordance with another embodiment of the present invention, a method for providing a chromatic dispersion estimate for a communication channel using an equalizer, includes calculating a spectral response of a feedforward filter of the equalizer; determining a group delay at discrete frequencies for a frequency spectrum; and determining a weighted average of the group delays to estimate a group delay variation as a measure of the chromatic dispersion.

In accordance with another embodiment of the present invention, a method for providing a polarization mode dispersion estimate for a communication channel using an equalizer, includes determining a frequency $f_0$ at which a spectral response is minimal; and calculating the polarization mode dispersion based on the frequency $f_0$.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
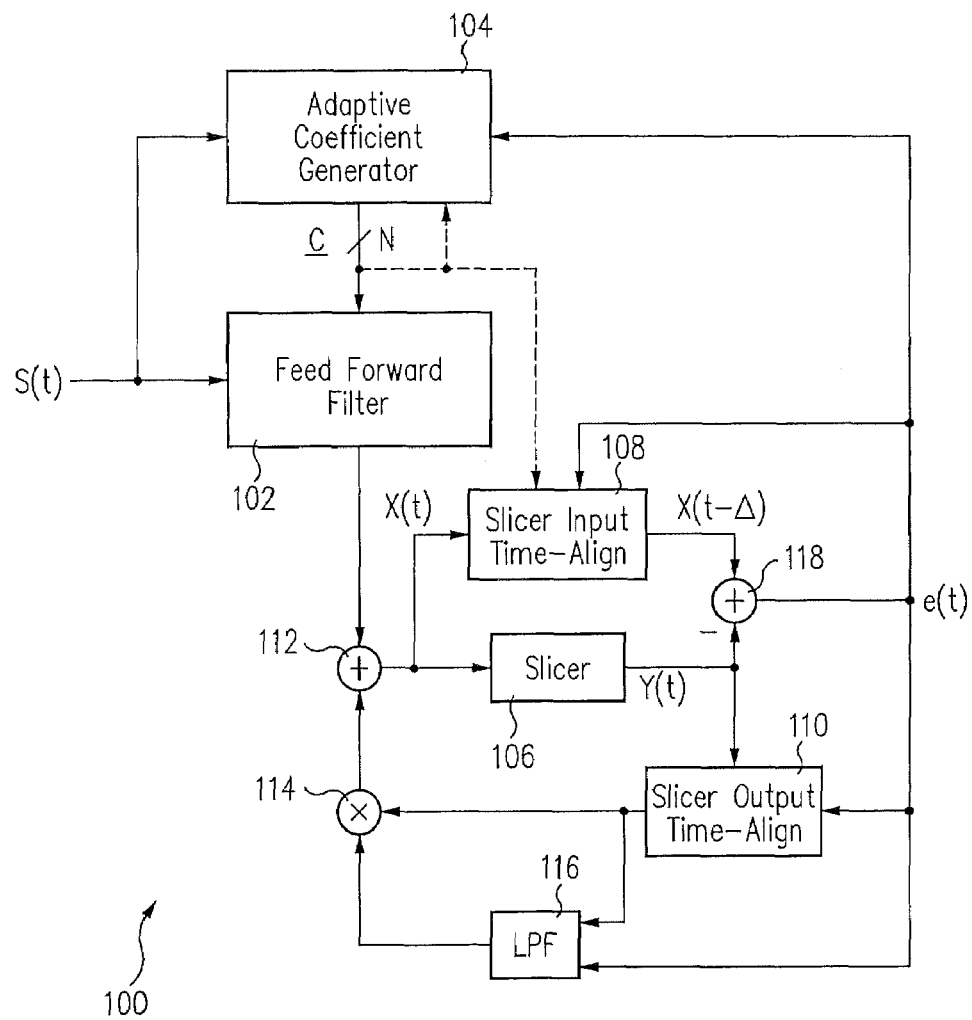
FIG. 1 shows a structure for implementing an adaptation network in accordance with one aspect of the invention for a continuous-time LMS based system.

FIG. 1 shows one embodiment of the present invention for a continuous-time least mean square (LMS) based adaptive equalizer 100. LMS-based equalizer 100 includes a feedforward filter 102, an adaptive coefficient generator 104, an output signal slicer 106, a slicer input time-align circuit 108, and slicer output time-align circuit 110. Feedforward filter 102 receives an input data signal s(t) and tap coefficients from adaptive coefficient generator 104 and generates an equalized signal, which is input to an adder 112. The other input to adder 112 is the product 114 of the output of an integrator, such as a low pass filter block 116, and slicer output time-align circuit 110.

The feedback signal (from product 114) into adder 112 provides an iterative correction to an error signal e(t) for use by adaptive coefficient generator 104 to generate adaptive tap coefficients. The error signal, processing through adder 118, is the difference between the outputs of slice input time-align circuit 108 and slicer 106, $x(t-\Delta)$ and y(t), respectively. As time passes, the error signal converges until a sufficiently small error signal is obtained through adaptively changing the tap coefficients.

Figure 2:
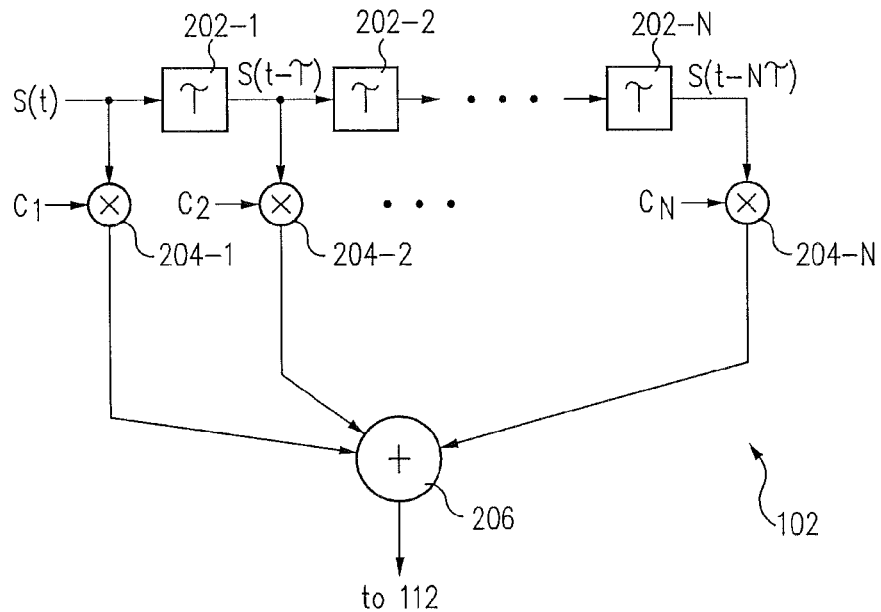
FIG. 2 shows one embodiment of a feedforward filter suitable for use in the system of FIG. 1.

FIG. 2 shows one embodiment of a feedforward filter suitable for use as feedforward filter 102 of FIG. 1. The feedforward filter includes a series of signal delay elements 202-1 to 202-N. Each delay element 202 delays the incoming signal by a fixed amount $\tau$, e.g., $s(t-\tau)$, $s(t-2\tau)$, ... $s(t-N\tau)$. The delay $\tau$ is typically selected to be less than a symbol period, and in one embodiment, about half a symbol period to achieve good performance at low SNR. The input data signal s(t) and each successive delayed signal from delay elements 202-1 to 202-N are multiplied by multipliers 204-1 to 204-N with its respective adaptive coefficient signals from adaptive coefficient generator 104. The product signals are then summed by an adder circuit 206 to form the equalized signal.

Figure 3:
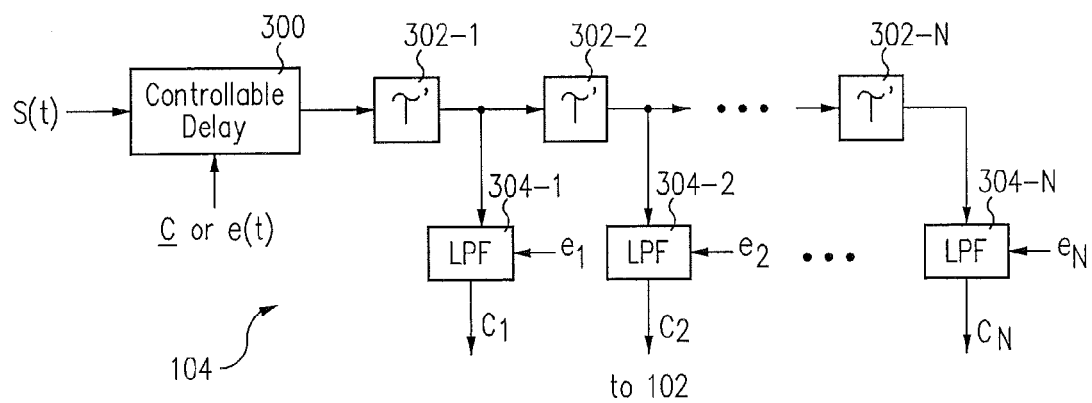
FIG. 3 shows one embodiment of an adaptive coefficient generator for use in the system of FIG. 1.

FIG. 3 shows one embodiment of an adaptive coefficient generator for use as adaptive coefficient generator 104 of FIG. 1. The generator includes a controllable delay 300, which receives input data signal s(t) and either vector c (tap coefficient vector) which is the feedback from the output of low pass filter blocks 304 or the error signal e(t), and introduces a fixed delay into the signal. One type of controllable delay suitable for the present invention is an error timing control (ETC) and precursor/postcursor control (PPC) circuit, such as described in commonly-owned U.S. patent application Ser. No. 10/290,993, filed Nov. 8, 2002, entitled "Adaptive Signal Equalizer with Adaptive Error Timing and Precursor/Postcursor Configuration Control", which is incorporated herein by reference in its entirety. The controllable delay in the present invention is used to align the error signal e(t) with the input signal s(t). In one embodiment, the ETC/PPC circuit of the above referenced application is used to adaptively set the delay by using the tap coefficients $c_1$ to $c_N$ of vector c or error signal e(t) as a control input signal. Note that FIG. 1 shows two possible inputs to adaptive coefficient generator 104, either tap coefficient c (shown as a dotted line) or error signal e(t) (shown as a solid line), along with input signal s(t).

Figure 3A:
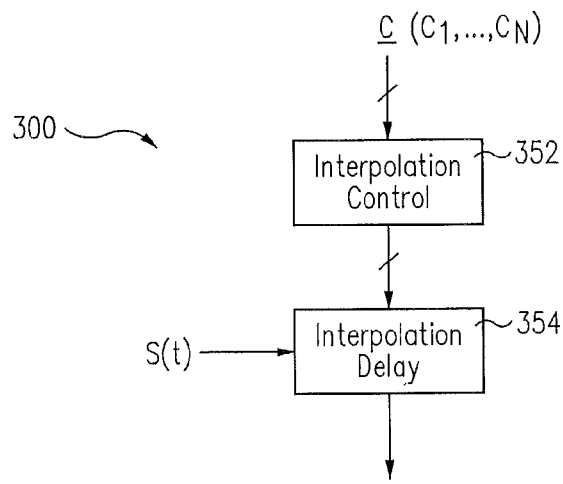
FIG. 3A shows one embodiment of a controllable delay in FIG. 3.

FIG. 3A shows one embodiment of controllable delay 300. Controllable delay 300 includes an interpolation control stage 352 and an interpolation delay stage 354. Interpolation control 352 processes the feedback tap coefficients $c_1$ to $c_N$ to produce a set of delay interpolation control signals for interpolation stage 354. In response to these delay interpolation control signals, interpolation delay stage 354 processes its input signal s(t) to produce the corresponding delayed signal for processing by delay elements 302.

Figure 3B:
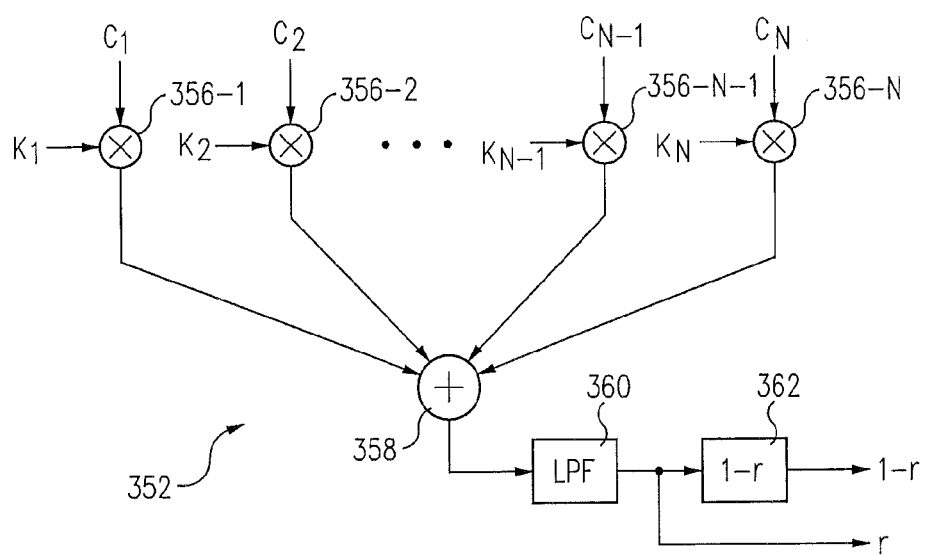
FIG. 3B shows one embodiment of an interpolation control circuit of FIG. 3A.

FIG. 3B shows one embodiment of interpolation controller 352. Interpolation controller 352 includes a set of signal multipliers 356-1 to 356-N, a signal combining circuit 358, a signal integration circuit (e.g., a low pass filter) 360, and a signal complement circuit 362, interconnected substantially as shown. Each of the feedback adaptive coefficient signals $c_1$ to $c_N$ is multiplied in a respective multiplier 356-1 to 356-N with a corresponding weighted or scaled signal $K_1$ to $K_N$. In one embodiment, $K_1$ to $K_{N/2}$ are equal to +1, while $K_{(N/2)+1}$ to $K_N$ are equal to −1. The resulting product signals are summed in signal combiner 358. The sum signal is integrated by signal integrator 360 to produce the primary delay interpolation control signal representing the timing control ratio parameter r. This delay interpolation control signal is also complemented by signal complement circuit 362 to provide the complement delay interpolation control signal. Signal complement circuit 362 processes the delay interpolation control signal by subtracting it from a normalized value (e.g., unity) to produce the complement signal. The uncomplemented and complemented signals are then processed by interpolation delay 354.

Figure 3C:
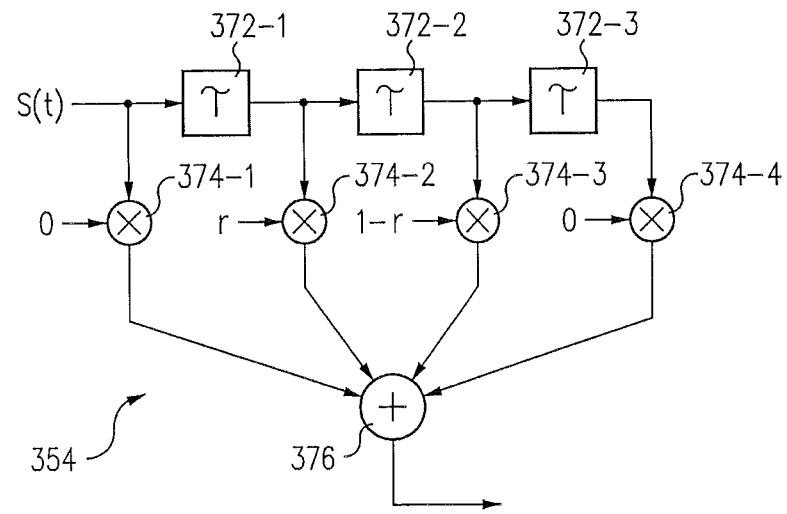
FIG. 3C shows one embodiment of an interpolation delay circuit of FIG. 3A.

FIG. 3C shows one embodiment of interpolation delay 354. Interpolation delay 354 includes three signal delay elements 372-1, 372-2, and 372-3. The incoming signal, i.e., the input signal s(t), and the corresponding successively time-delayed versions are multiplied in signal multipliers 374-1, 374-2, 374-3, and 374-4 with corresponding interpolation control signals. The resulting product signals are summed in a signal combiner 376 to produce the delayed version of the incoming signal.

Figure 4:
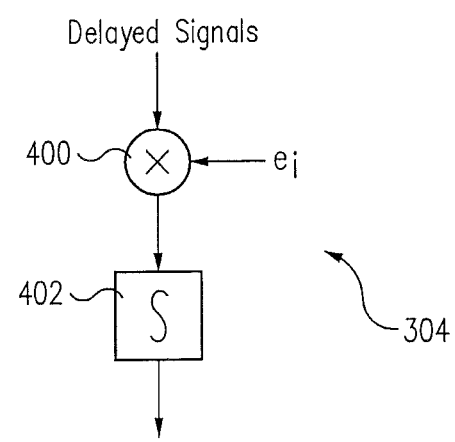
FIG. 4 shows one embodiment of a low pass filter block suitable for use in the system of FIG. 3.

Referring to FIG. 3, the aligned output signal of controllable delay 300 is processed through a series of delay elements 302-1 through 302-N. Delay elements 302 introduce a delay of $\tau'$ to its input signal. In one embodiment, $\tau'$ is greater than the delay $\tau$ of delay elements 202 of FIG. 2, although it may also be suitable for $\tau'$ to be approximately equal to $\tau$ in other embodiments. Having $\tau' > \tau$ results in a generally more robust system. The delayed signals (by multiples of $\tau'$) are input to respective low pass filter blocks 304-1 to 304-N, along with the error signal e(t) from adder 118 of FIG. 1. Low pass filter blocks 304 multiply each delayed signal with a corresponding error signal and integrate the result to generate individual tap coefficient signals for use by multipliers 204-1 to 204-N of FIG. 2. FIG. 4 shows one embodiment of low pass filter block 304, which includes a multiplier circuit 400 and an integrator circuit, such as a low pass filter 402.

In one embodiment, low pass filters 402 are analog (or continuous-time) first-order low-pass filters having a transfer function $$H(s) = \frac{G}{1 + s \cdot T_l}$$

where G is the gain of the low pass filter and $T_1$ is the leakage time constant. The filter parameters gain G and time constant $T_1$ can be chosen to meet system and component requirements. For example, the time constant $T_1$ is selected as a non-zero positive number for more robust performance with a fractionally-spaced feedforward filter at the front-end. The gain G should be large enough so that the mismatch of the tap coefficient with the least-mean square value at convergence is sufficiently small. Further, $T_1 > 0$ and G need to be moderate enough to minimize the effects of "tap coefficient drift". Another factor in selecting gain G and time constant $T_1$ is to achieve a convergence time that is sufficiently small for the system.

Selecting values for G and $T_1$ depend on system requirements and include factors such as the maximum steady state mismatch of signals, time variability of the channel, amount of noise within the channel, and parasitic effects of the circuit. In one embodiment, the gain G may be set to 10 to 50 which will result in small mismatch and possibly stable operation. The time constant $T_1$ is typically set to about 10,000 to 100,000 symbol times, in one embodiment. For very fast varying channels, $T_1$ is much smaller. $T_1$ is larger for channels having less temporal variations and more noise. Higher order low pass filters are also suitable for use with the present invention.

Referring back to FIG. 1, similarly, low pass filter block 116 receives error signal e(t) from adder 118 and the output of slicer output time-align circuit 110. These two signals are then multiplied and integrated by low pass filter block 116.

Figure 5:
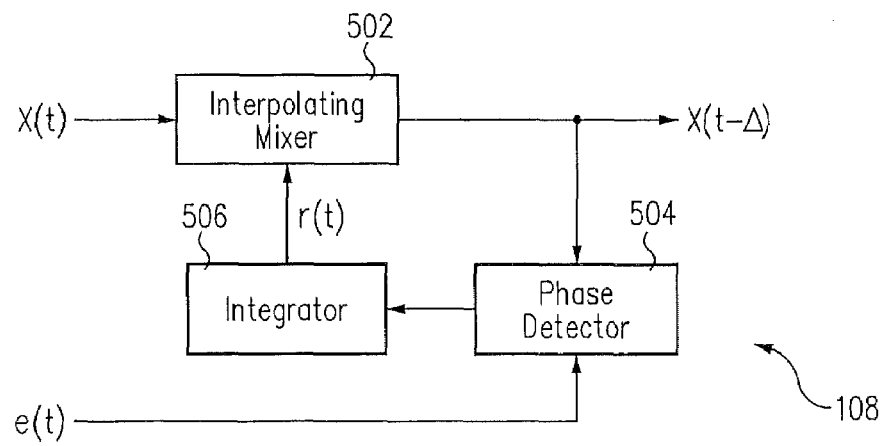
FIG. 5 shows one embodiment of a slicer input time align circuit for use in the system of FIG. 1.

FIG. 5 shows one embodiment of a slicer input time-align circuit for use as slicer input time-align circuit 108 of FIG. 1. The circuit includes a controllable delay, which receives the data signal x(t) from adder 112 of FIG. 1 and introduces a delay Δ into the signal. One type of controllable delay suitable for the present invention is an adaptive least mean square-based timing interpolation (ALTI) circuit, such as described in commonly-owned U.S. patent application Ser. No. 10/321,893, filed Dec. 17, 2002, entitled "Adaptive Signal Latency Control for Communications Systems Signals", which is incorporated herein by reference in its entirety.

The controllable delay in the present invention is used to time align the slicer input signal with the slicer output. In one embodiment, the ALTI circuit of the above referenced application is used to adaptively set the delay to align the signals by using the tap coefficients $c_1$ to $c_N$ of vector c or error signal e(t) as a control input signal. Note that FIG. 1 shows two possible inputs to slicer input time-align circuit 108, either tap coefficient c (shown as a dotted line) or error signal e(t) (shown as a solid line), along with signal x(t) from adder 112. The ALTI block may be used to time-align the slicer input to compute the "slicer error" signal which is the difference between the slicer output and the slicer input signals, i.e., the time-align circuit 108 delays its output signal x(t−Δ) to compensate for delays introduced by processing of the input signal by the circuit.

FIG. 5 shows one embodiment of slicer input time-align circuit 108, which includes an interpolating mixer 502, a phase detector 504, and a signal integrator 506, interconnected substantially as shown. The error signal e(t) is compared in signal phase by phase detector 504 with the delayed signal from interpolating mixer 502. The resulting detection signal is integrated by signal integrator 506 (e.g., a low pass filter) to produce an interpolation control signal r(t) for interpolating mixer 502.

Figure 5A:
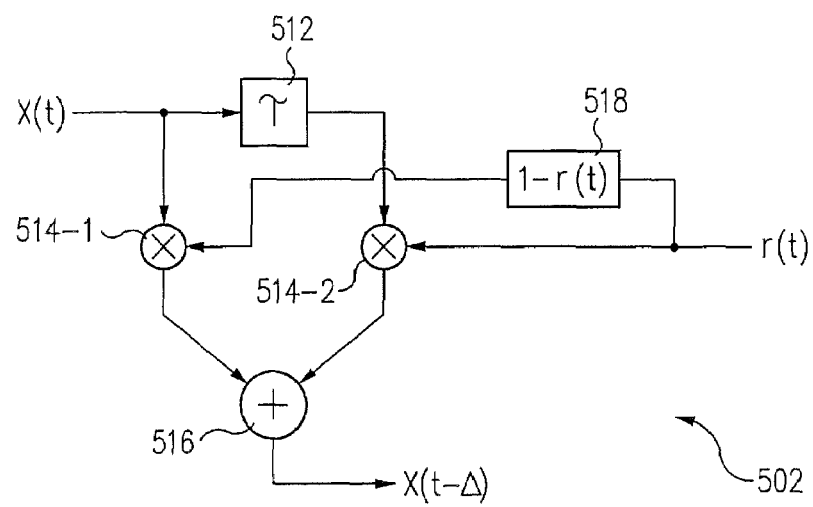
FIG. 5A shows one embodiment of an interpolating mixer circuit of FIG. 5.

FIG. 5A shows one embodiment of interpolating mixer 502, which is implemented as a tapped delay line with correlated tap coefficients. The input signal x(t) is delayed by a signal delay element 512 which is a fractional delay element introducing a delay which is less than one data symbol period in duration. The resulting fractionally delayed signal and the original input signal x(t) are mixed (e.g., multiplied) in respective signal mixers 514-1, 514-2 with respective interpolation control signals representing timing interpolation parameters. The first timing interpolation parameter signal is the feedback signal from signal integrator 506 (FIG. 5). This signal is also complemented by a signal complement circuit 518 in which the input signal is subtracted from a normalized value (e.g., unity) to produce the second timing interpolation parameter signal. The resultant mixed signals are combined (e.g., summed) in a signal combining circuit 516 to produce the delayed signal x(t−Δ).

Figure 5B:
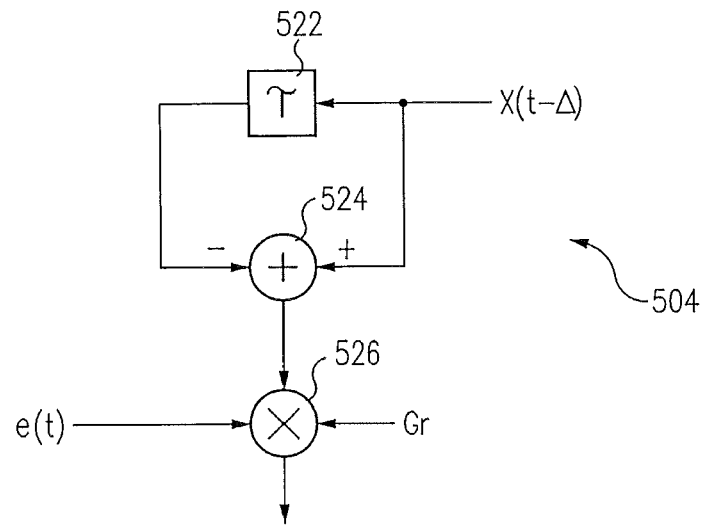
FIG. 5B shows one embodiment of a phase detector circuit of FIG. 5.

FIG. 5B shows one embodiment of phase detector 504 of FIG. 5, which can be implemented using a fractional delay element 522, a signal combining circuit 524, and a signal mixer 526, interconnected substantially as shown. The delayed signal x(t−Δ) is further delayed by fractional delay element 522, after which it is combined with delayed signal x(t−ΔA) in signal combiner 524 such that the further delayed signal is subtracted from the input delayed signal x(t−Δ). The resulting combined signal is mixed (e.g., multiplied) in signal mixer 526 with the error signal e(t) (and a gain constant $G_r$, if desired) to produce the phase detection signal for signal integrator 506 (FIG. 5A).

Figure 6:
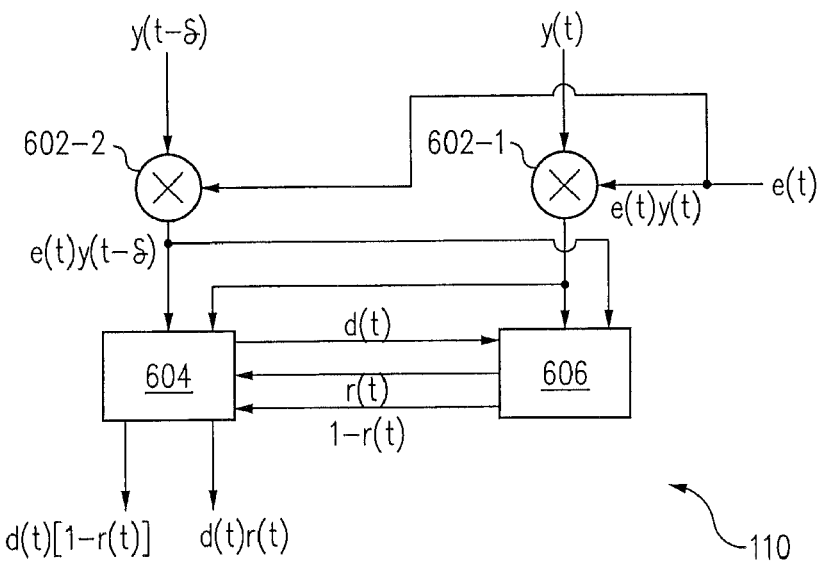
FIG. 6 shows one embodiment of a slicer output time align circuit for use in the system of FIG. 1.

FIG. 6 shows one embodiment of a slicer output time-align circuit for use as slicer output time-align circuit 110 of FIG. 1. The circuit includes a controllable delay, which receives the data signal y(t) from slicer 106 of FIG. 1 and introduces a delay into the signal. One type of circuit suitable for the present invention is a fat tap adaptation (FTA) circuit, such as described in commonly-owned U.S. patent application Ser. No. 10/322,024, filed Dec. 17, 2002, entitled "Adaptive Coefficient Signal Generator for Adaptive Signal Equalizers with Fractionally-Spaced Feedback", which is incorporated herein by reference in its entirety.

The controllable delay in the present invention is used to time align the decision feedback signal, which is the signal from slicer 106, to be a symbol period delay with respect to the slicer input signal from which it is cancelled. A method of obtaining this delay in an adaptive manner is by using the FTA block, as described in the above-referenced application, which uses the tap coefficients or error signal e(t) as a control input signal.

FIG. 6 shows one embodiment of slicer output time-align circuit 110, which includes multiplier circuits 602-1, 602-2 and control signal generator circuitry implemented as a coefficient signal generator 604 and a timing interpolation parameter signal generator 606, all interconnected as substantially shown. The adjacent time-delayed feedback signals, the output signal y(t) of slicer 106 (FIG. 1) and the signal y(t−δ) delayed by a symbol period δ, are multiplied in their respective multiplier circuits 602-1, 602-2 with the error signal e(t). The resulting product signals e(t)y(t) and e(t)y(t−δ) are processed by signal generator circuits 604, 606. Coefficient signal generator circuit 604 provides an adaptation control signal d(t) to timing interpolation parameter signal generator circuit 606, which in return, provides two other adaptation control signals r(t) and 1−r(t) back to coefficient signal generator 604. As a result of processing these input signals e(t)y(t), e(t)y(t−δ), r(t), and 1−r(t), coefficient signal generator 604 provides the adaptive coefficient signals d(t)r(t) and d(t)[1−r(t)], where signal element d(t) is the weighting factor and signal element r(t) is the factor indicative of the degree of correlation between the adjacent time-delayed feedback signals y(t) and y(t−δ).

Figure 6A:
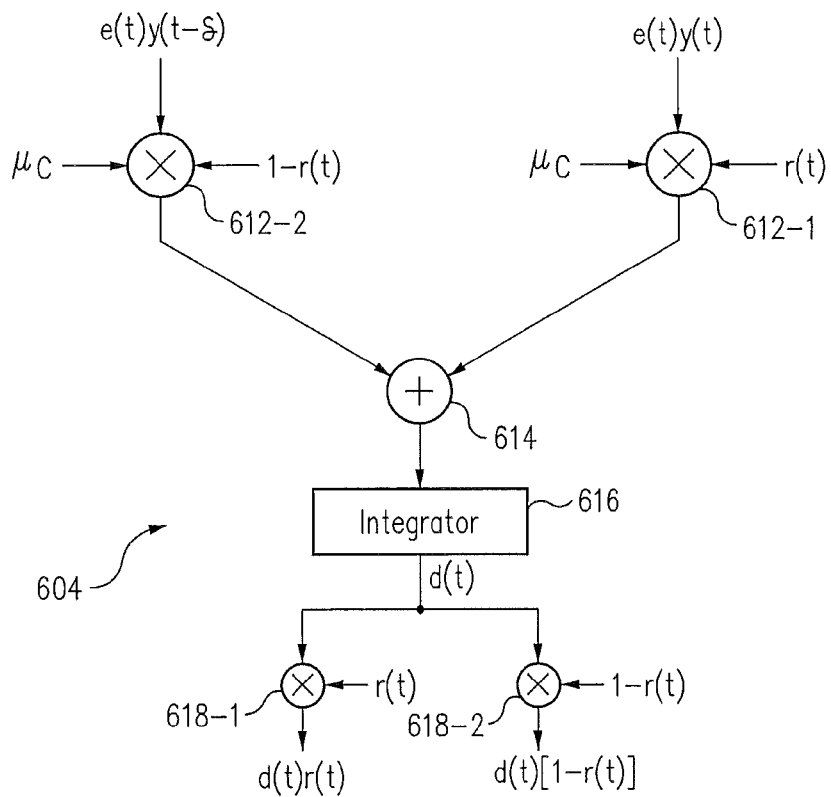
FIG. 6A shows one embodiment of a coefficient generator circuit of FIG. 6.

FIG. 6A shows one embodiment of coefficient signal generator 604. Initial product signals y(t) and y(t−δ) are further multiplied in multiplier circuits 612-1, 612-2 with the adaptation control signals r(t) and 1−r(t), respectively, from timing interpolation parameter signal generator 606. An additional constant signal $\mu_c$ can also be multiplied as part of the product operations or implemented as a constant scaling factor within the multiplier circuits 612-1, 612-2.

The resulting product signals are summed in a signal summing circuit 614. The resulting sum signal is integrated in an integration circuit 616 (e.g., a low pass filter) to produce the first adaptation control signal d(t). This adaptation control signal d(t), in addition to being provided to timing interpolation parameter signal generator 606, is multiplied within multiplier circuits 618-1, 618-2 with the other adaptation control signals r(t) and 1−r(t), respectively, provided by timing interpolation parameter signal generator 606. The product signals resulting from these multiplication operations are the adaptive coefficient signals d(t)r(t) and d(t)[1−r(t)]

Figure 6B:
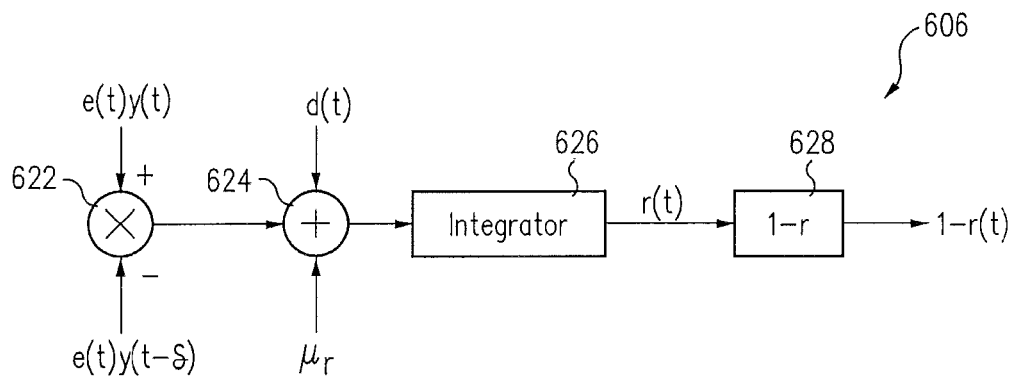
FIG. 6B shows one embodiment of a timing interpolation parameter signal generator circuit of FIG. 6.

FIG. 6B shows one embodiment of timing interpolation parameter signal generator 606. The initial product signals e(t)y(t) and e(t)y(t−δ) are differentially summed in a signal summing circuit 622, where the second product signal e(t)y(t−δ) is subtracted from the first product signal e(t)y(t). The resulting difference signal is multiplied in a multiplier circuit 624 with the adaptation control signal d(t) provided by coefficient signal generator 604. As with the multiplier circuits 612-1, 612-2 of coefficient signal generator 604, an additional constant signal $\mu_\tau$ can also be used in this multiplication operation or implemented as a constant scaling factor within multiplier circuit 624 operation.

The resulting product signal is integrated by a signal integration circuit 626 (e.g., a low pass filter) to produce one of the adaptation control signals r(t) used by coefficient signal generator 604. This adaptation control signal r(t) is further processed by a signal complement circuit 628, in which the input signal r(t) is subtracted from a reference signal having a normalized value, with the resulting difference signal 1−r(t) serving as the other adaptation control signal used by coefficient signal generator 604. For example, if the value of the incoming signal r(t) were considered to have a normalized signal value range bounded by the values of zero and one, signal complement circuit 628 subtracts the incoming signal r(t) from the value of one to produce the output signal 1−r(t).

The above described embodiment utilizes a fractionally-spaced linear equalizer with decision feedback circuitry. By selecting the appropriate parameters for the low pass filters, the convergence of the least mean square value can be controlled to prevent coefficient drift of the adaptive tap coefficients. The continuous time iterative process results in the ability to adaptively change the tap coefficients for error minimization.

Further details regarding the application of equalizers within a communication system may be found in U.S. Pat. No. 7,016,406 entitled "Adaptation Structure and Methods for Analog Continuous Time Equalizers" and issued on Mar. 21, 2006, which is incorporated herein by reference in its entirety.

Figure 7:
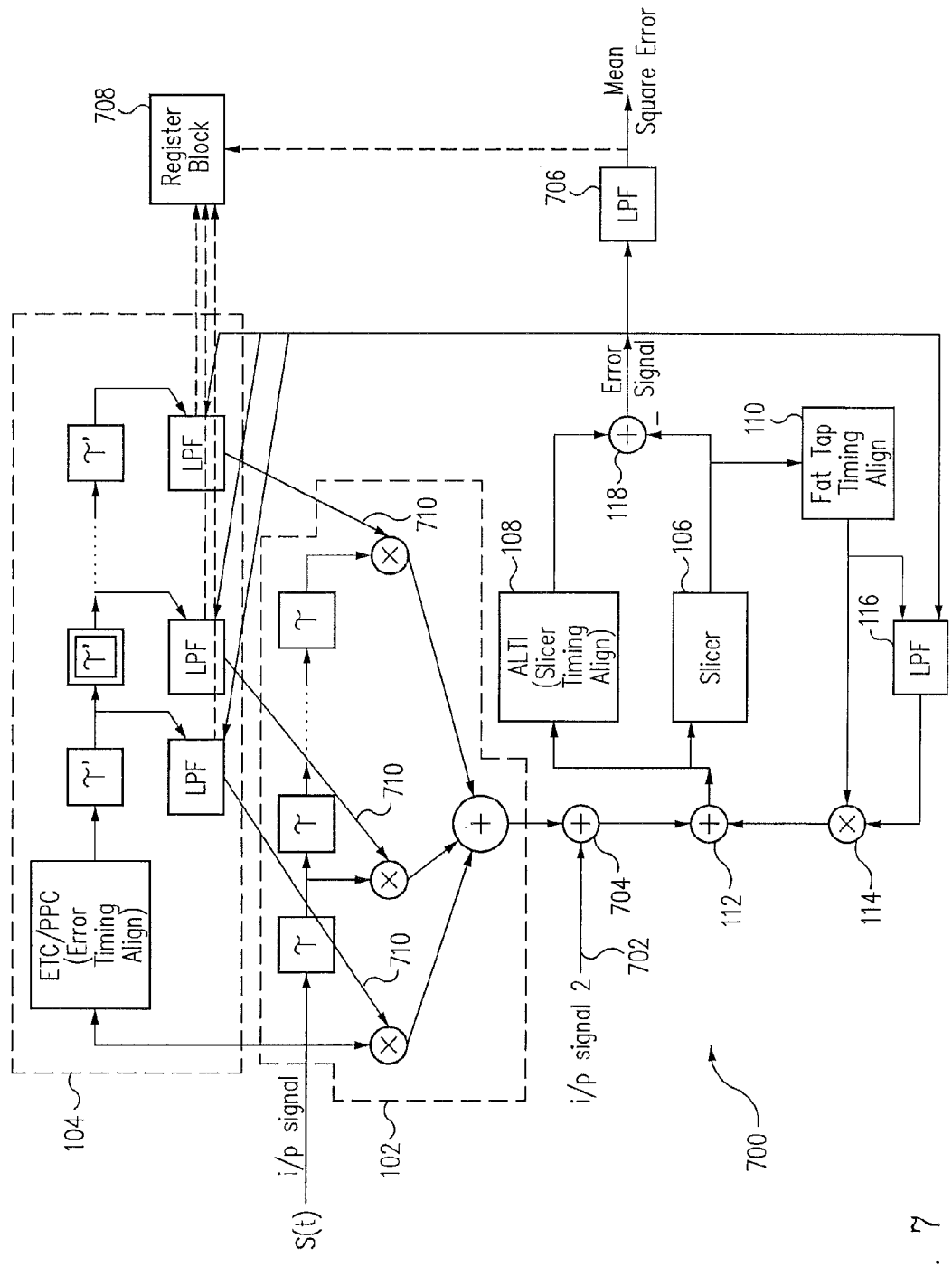
FIG. 7 shows a structure for implementing an adaptation network in accordance with one aspect of the invention.

According to another aspect of the invention, an equalizer can be adapted to provide channel monitoring and performance monitoring, such as for dispersion compensation. For example, FIG. 7 shows an equalizer 700 for implementing an adaptation network in accordance with one aspect of the invention. Equalizer 700 is similar to equalizer 100 described in reference to FIG. 1 and therefore, differences will be described but detailed information regarding similar or like elements will not be repeated. As shown in FIG. 7, equalizer 700 includes feedforward filter 102, adaptive coefficient generator 104, slicer 106, slicer input time-align circuit 108, and slicer output time-align circuit 110.

In general and as noted above, an error timing control/precursor postcursor control (ETC/PPC) block within adaptive coefficient generator 104 may be used to time align the input data signal s(t) of an adaptation tap with the error signal e(t). The ETC/PPC block, as discussed above, may receive as an input signal the tap coefficient vector c or the error signal e(t). Slicer input time-align circuit 108 (labeled ALTI for adaptive LMS-based timing interpolation) may be employed to time-align an input signal to slicer 106 to compute a slicer error signal, which is the time difference between an output signal of slicer 106 and the input signal to slicer 106. Slicer input time-align circuit 108, as discussed above, may also receive as an input signal tap coefficients or the error signal e(t). Slicer output time-align circuit 110 may also receive as an input signal the error signal e(t) and may be employed to time-align the feedback signal with a symbol period.

Equalizer 700 may be employed as a fractionally-spaced linear equalizer with decision feedback to provide a continuous-time adaptation for a communication channel or a network. As shown in FIG. 7, equalizer 700 may receive an input signal (labeled i/p signal 2) 702 and further include an adder 704, a low pass filter block 706, and a register block 708.

Low pass filter block 706, for example, is an analog (continuous-time) first order (or higher order) low pass filter. As an example, if low pass filter block 706 is a first order low pass filter, the transfer function may be represented by the following equation:

$$H(s)=G/(1+s \cdot T_1)$$

where G represents the gain of low pass filter block 706 and $T_1$ represents the leakage time-constant. Low pass filter block 706 receives the error signal e(t) and provides an output signal that indicates a mean square error of the error signal e(t).

Register block 708 may be utilized to store the tap coefficients from adaptive coefficient generator 104. Register block 708 may also be utilized to store various other tap coefficient values, the output signal from low pass filter block 706 (i.e., the mean square error of the error signal e(t)), and/or other desired information. The information stored by register block 708 may, for example, be utilized by a processor (e.g., a microprocessor, microcontroller, or other type of logic device) to monitor a communication channel and determine its performance, as described in further detail below.

Equalizer 700 may be utilized to estimate various communication channel parameters, such as bandwidth, identification, signal-to-noise, chromatic dispersion, and polarization mode dispersion. In general, certain communication channel impairments within a network, such as for example the amount of chromatic dispersion and/or differential modal dispersion, may only need to be estimated once or only a few times (e.g., during network deployment or planning stage).

Certain other communication channel performance parameters, such as for example time-varying polarization mode dispersion and bit error rate, may need to be estimated often or periodically.

Bandwidth Estimation

As an example, the end-to-end bandwidth estimation (e.g., including a fiber channel, a transmitter optical subassembly (TOSA), and a receiver optical subassembly (ROSA)) and, more generally, the power spectral density per channel autocorrelation for multi-mode fiber (MMF) and single-mode fiber (SMF) channels may be performed by utilizing equalizer 700. For bandwidth estimation, slicer 106 is powered down (e.g., input and output signal paths are open circuited) and input signal 702 and tap coefficient signal paths 710 are not used (e.g., open circuited).

For operation in the fixed coefficient mode, slicer input time-align circuit 108 powered on, and slicer 106 powered off, one tap coefficient on the feedforward data path may be selected to be unity (e.g., the left-most or right-most tap coefficient) while the remaining tap coefficients on the feedforward data path are set to zero. Also, the ETC/PPC block within adaptive coefficient generator 104 and slicer input time-align circuit 108 may be set to an appropriate fixed delay (e.g., $\tau$ or $\tau'$).

Adaptpath coefficients (e.g., the tap coefficients from adaptive coefficient generator 104) may then be read from register block 708 to yield, after compensating for the offsets, the following correlation coefficient values (assuming for this example eight taps):

$$\tilde{c}_i \approx E(p(t) \cdot p(t-i\tau')), 0 \leq i \leq 7$$

where E is the expected value operator and p is the input signal s(t) received by feedforward filter 102.

It should be noted that the effect of filtering effects along the ETC/PPC block path and along the feedforward equalizer path (i.e., via feedforward filter 102) may have to be considered, but can be ignored in some cases.

Furthermore, by setting the fixed non-zero coefficient to be any other different feedforward equalizer tap coefficient, the following equation set is obtained:

$$\tilde{c}_{i,j} \approx E(p(t-j\tau) \cdot p(t-i\tau')), 0 \leq i \leq 7, 0 \leq j \leq 7.$$

Additionally, by changing the values of timing control ratios for slicer input time-align circuit 108 and the ETC/PPC block, further sets of correlation values may be obtained.

The Periodogram approach and Wiener-Khintchine result may then be employed to determine the power spectral density as in the following equation:

$$P_S(\omega) = K \cdot \sum_{i=0,k=0}^{i=7,k=7} \tilde{c}_{i,k} \cdot e^{-j\omega(i\cdot\tau-k\cdot\tau')}$$

where K is the normalization factor (e.g., equal to 64). A windowing function ($w_{i,k}$) may also be applied to the bandwidth estimation to obtain the power spectral density as in the following equation:

$$P_S(\omega) = K \cdot \sum_{i=0,k=0}^{i=7,k=7} w_{i,k} \cdot \tilde{c}_{i,k} \cdot e^{-j\omega(i\cdot\tau-k\cdot\tau')}$$

Channel Identification Estimation

The rendering of an unknown channel may be obtained in terms of a feedforward equalizer/decision feedback equalizer (FFE/DFE) filter. As an example, input signal 702 is generated as r(t)*h(t), where h(t) is the unknown channel impulse response that needs to be estimated and r(t) is a random signal that may be generated, for example, using a pseudo-random binary sequence (PRBS) signal or may be a continuous random process (e.g., additive white Gaussian noise (AWGN)). The input data signal s(t) is given as r'(t), where r'(t) equals r(t) or where r'(t) and r(t) are statistically equivalent.

Input signal 702 is subtracted from the feedforward equalizer output (i.e., output of feedforward filter 102), which has the input data signal s(t) as an input signal. The resulting difference signal needs to be minimized and adaptation of FFE/DFE coefficients may be carried out to minimize this difference signal power. For example, this operation may be performed by powering down the input and output signal paths of slicer 106. The resulting FFE/DFE tap coefficients that are attained at convergence correspond to the LMS optimal set of tap coefficients that regenerate the unknown channel with this architecture.

Optical Signal-to-Noise Ratio (OSNR) Estimation

As an example, a signal s(t) may be denoted as an input signal to slicer 106 and MSE as the mean squared error as obtained as an output signal from low pass filter block 706 (FIG. 7). In general, an LMS DFE is a biased estimator and the MSE is obtained as the filtered squared error signal and the signal power obtained as the squared output power of slicer 106. Thus, the biased electrical SNR is given by the following equation:

$$SNR_{e,b} = \frac{\langle s^2(t) \rangle}{MSE}$$
$$= SNR_{e,u} + 1$$

where $SNR_{e,u}$ is a corresponding unbiased electrical SNR.

$SNR_{e,u}$ is related to the electrical SNR, denoted as $SNR_e$, at the input to the dispersion compensation electronics (DCE) as illustrated in the following equation (assuming for this example eight taps):

$$SNR_e = \left( \sum_{i=0}^{7} c_i^2 \right) \cdot SNR_{e,u}$$

where $c_i$ are the FFE tap coefficients.

The OSNR at the DCE input is then given by the following equation:

$$OSNR = \sqrt{SNR_e}$$

The bit error rate (BER) at the output of the DCE may then be given by the following equation (ignoring the extinction ratio):

$$BER = Q(0.5 \cdot \alpha \cdot \sqrt{SNR_{e,u}})$$

where $\alpha$ is a determinable constant (e.g., nominally set to one). An alternative technique for estimating the $SNR_e$ is given by the following equations:

$$SNR_e = \frac{\left(\sum_{i=0}^{7} c_i^2\right)}{\frac{1}{\sum_{i=0}^{7} c_i + f - 1}} \text{ and } SNR_{e,u} = \left(\frac{1}{\sum_{i=0}^{7} c_i + f - 1} - 1\right)^{-1}$$

where $c_i$ are closed-circuit tap coefficients, which are equal to $\tilde{c}_i$, and f is the frequency.

Chromatic Dispersion Estimation

In the presence of linear and non-linear dispersion, the amount of chromatic dispersion within the channel may be computed from the uncompensated non-linear dispersion. Next, the linear part of the dispersion due to chromatic dispersion is corrected. The remaining linear uncompensated dispersion due to the miscellaneous linear dispersion is then estimated.

Initially, chromatic dispersion is considered as the sole source of dispersion and the total chromatic dispersion-induced jitter is computed. For example, one technique for estimating the chromatic dispersion is by estimating the bandwidth roll-off as is done similarly for estimating the power spectral density of a signal. A look-up table can then be used to estimate the chromatic dispersion.

An alternative approach is to first compute the spectral response of the FFE filter (i.e., feedforward filter 102) based on the following equation (assuming for this example eight taps):

$$P(\omega) = \sum_{i=0}^{7} c_i \cdot e^{j \cdot i \cdot \omega \cdot \tau}$$

Then, the group delay at the low end of the frequency spectrum (e.g., 500 MHz) and at the high end of the frequency spectrum (e.g., 5 GHz) along with discrete frequencies in between the low end and the high end is determined. A weighted average of the group delays across the frequencies (e.g., weighted by the spectral amplitude) is then determined to estimate the group delay variation as a measure of the chromatic dispersion.

Polarization Mode Dispersion Estimation

As an example, the first-order polarization mode dispersion is modeled as a two-path channel with a differential modal delay between the two paths. From the estimated power spectral density, we determine the frequency $f_0$ (e.g., in GHz) at which the spectral response is minimal. The first-order polarization mode dispersion (or the differential modal delay) is then given by the following equation:

$$\tau_{pmd} = \frac{1}{2 \cdot f_0}$$

(e.g., in nanoseconds).

The above-described embodiments of the present invention are merely meant to be illustrative and not limiting. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. A method for providing correlation values for determining a power spectral density for a communication channel using an equalizer, the method comprising:
   switching off a slicer of the equalizer;
   setting tap coefficients of a feedforward filter of the equalizer to fixed values; and
   calculating said correlation coefficient values.

2. The method of claim 1, wherein the correlation coefficient values are calculated based on the following equation, $\tilde{c}_i \approx E(p(t) \cdot p(t-i-\tau'))$, $0 \leq i \leq N$,
   where N is the number of tap coefficients, E is the expected value operator, and p is an input signal received by the feedforward filter having eight multipliers.

3. The method of claim 1, further comprising:
   changing one or more of the values for the tap coefficients; and
   calculating a set of correlation coefficient values.

4. The method of claim 2, further comprising calculating the power spectral density based on the set of correlation coefficient values.

5. The method of claim 4, wherein the power spectral density calculation utilizes a windowing function.

6. The method of claim 1, wherein the set of correlation coefficient values are calculated based on the following equation,
   $\tilde{c}_{i,j} \approx E(p(t-j \cdot \tau) \cdot p(t-i' \cdot \tau'))$, $0 \leq i \leq N$, $0 \leq j \leq N$, where N is the number of tap coefficients.

7. The method of claim 1, further comprising changing timing control ratios of the equalizer to calculate further sets of correlation coefficient values.

* * * * *